US012768943B2

(12) United States Patent
Emadi et al.

(10) Patent No.: US 12,768,943 B2
(45) Date of Patent: Oct. 20, 2026

(54) RADAR SYSTEM WITH COORDINATE CALIBRATION FOR IMPROVED ANGULAR RESOLUTION

(71) Applicant: Zadar Labs, Inc, Santa Clara, CA (US)

(72) Inventors: Mohammad Emadi, San Jose, CA (US); Ali Mostajeran, Morgan Hill, CA (US); Mahmoud Saadat, Redwood City, CA (US)

(73) Assignee: Zadar Labs Inc., Campbell, CA (US)

( * ) Notice: Subject to any disclaimer, the term of this patent is extended or adjusted under 35 U.S.C. 154(b) by 373 days.

(21) Appl. No.: 18/449,618

(22) Filed: Aug. 14, 2023

(65) Prior Publication Data

US 2024/0053437 A1 Feb. 15, 2024

Related U.S. Application Data

(60) Provisional application No. 63/371,423, filed on Aug. 15, 2022.

(51) Int. Cl.

| | |
|---|---|
| ***G01S 7/40*** | (2006.01) |
| ***G01S 7/292*** | (2006.01) |
| ***G01S 13/42*** | (2006.01) |
| ***G01S 13/931*** | (2020.01) |

(52) U.S. Cl.

CPC .............. *G01S 7/403* (2021.05); *G01S 7/292* (2013.01); *G01S 7/4034* (2021.05); *G01S 13/42* (2013.01); *G01S 2013/93271* (2020.01)

(58) Field of Classification Search

CPC ................. G01S 13/931; G01S 7/4021; G01S 2013/932; G01S 2013/9322; G01S 2013/9329; G01S 2013/9316; G01S 7/4034; G01S 7/4091; G01S 7/003; G01S 7/292; G01S 13/42; G01S 13/4454; G01S 13/878; G01S 13/60

See application file for complete search history.

(56) References Cited

U.S. PATENT DOCUMENTS

| | | | | |
|---|---|---|---|---|
| 7,071,867 | B2 * | 7/2006 | Wittenberg | G01S 17/66 342/75 |
| 8,494,764 | B2 * | 7/2013 | Lappe | G01C 21/28 701/422 |
| 10,310,063 | B2 * | 6/2019 | Ling | G01S 13/87 |
| 11,422,251 | B2 * | 8/2022 | Schoor | G01S 7/356 |

(Continued)

*Primary Examiner* — Vladimir Magloire
*Assistant Examiner* — Kimberly Jenkins
(74) *Attorney, Agent, or Firm* — UTULAW PC

(57) ABSTRACT

Disclosed herein are systems and methods for radar networking for improved angular resolution. In an embodiment, a radar network includes a first radar and a second radar attached to a vehicular platform or another appropriate platform. Through coarse beamforming from each radar, a landmark is detected. The landmark's rough location in the first radar's coordinate and the landmark's rough location in the second radar coordinate are determined. The radar network is calibrated, by setting the first radar's location as the reference location and determining the second radar's location relative to it. Phase differences that may arise from relative positional or timing misalignment between the radars may be compensated. Fine beamforming is performed on the calibrated radars, and data from the fine beamforming is processed with the pre-detected target data to cancel out grating lobes.

17 Claims, 11 Drawing Sheets

(56) References Cited

U.S. PATENT DOCUMENTS

| | | | | |
|---|---|---|---|---|
| 11,520,030 | B2 * | 12/2022 | Wu | G01S 7/288 |
| 12,399,255 | B2 * | 8/2025 | Emadi | G01S 7/411 |
| 2010/0245564 | A1 * | 9/2010 | Nam | G06T 7/73<br>348/135 |
| 2018/0024235 | A1 * | 1/2018 | Hong | G01S 13/87<br>342/59 |
| 2018/0088224 | A1 * | 3/2018 | Kishigami | G01S 13/46 |
| 2018/0128913 | A1 * | 5/2018 | Bialer | G01S 13/89 |
| 2019/0128678 | A1 * | 5/2019 | Merfels | G01C 21/3811 |
| 2020/0226790 | A1 * | 7/2020 | Alvarez | G01S 13/865 |
| 2020/0371229 | A1 * | 11/2020 | Levitan | G01S 7/285 |
| 2021/0278511 | A1 * | 9/2021 | Krishnan | G01S 7/4026 |
| 2022/0094397 | A1 * | 3/2022 | Wu | H04B 7/0617 |
| 2022/0099795 | A1 * | 3/2022 | Crouch | G01S 13/003 |
| 2022/0099817 | A1 * | 3/2022 | Crouch | G01S 13/426 |
| 2022/0229167 | A1 * | 7/2022 | Loesch | G01S 7/4026 |
| 2023/0213354 | A1 * | 7/2023 | Qi | G01C 21/3833<br>701/450 |
| 2025/0085414 | A1 * | 3/2025 | Pandharipande | G01S 13/584 |

* cited by examiner

RADAR SYSTEM WITH COORDINATE CALIBRATION FOR IMPROVED ANGULAR RESOLUTION

CROSS-REFERENCE TO RELATED APPLICATIONS

The present application claims priority to U.S. provisional application No. 63/371,423, filed Aug. 15, 2022, and entitled "RADAR NETWORKING FOR BETTER ANGULAR RESOLUTION," which is hereby incorporated herein in its entirety for all purposes.

BACKGROUND

Field of the Art

The present embodiments relate to radar systems. More specifically, the present embodiments relate to systems, apparatus, and methods for radar networking for improved angular resolution in object detection.

Discussion of the State of the Art

Achieving high resolution, such as high angular resolution, azimuth resolution, elevation resolution, and so forth, is important in object detection, such as in autonomous vehicle applications. Generally, resolution is directly correlated with the physical size or length of the antenna array. Thus, having a large array aperture size achieves a narrower beam or higher resolution. However, some applications cannot accommodate a physical increase in antenna array size. For example, to achieve 0.5 degrees resolution, a 0.5-meter size array is needed (e.g., at around 70-77 GHz for an autonomous vehicle platform), but such a physical size is impracticably and infeasibly large for a vehicle platform.

Conventional radar systems often face challenges in achieving high angular resolution. Using a single radar unit can limit the system's ability to accurately determine the location of objects, especially in complex environments with multiple obstacles and reflections. Attempts to improve angular resolution by increasing the power or frequency of the radar signals often come with increased cost, complexity, and power consumption. Multiple radar units positioned at different locations have been explored but require complex calibration procedures and sophisticated algorithms, adding to the time and computational effort.

Other conventional techniques to increase array size include multiple input, multiple output (MIMO) techniques. While MIMO techniques can increase antenna array elements virtually, there are several drawbacks. First, implementation of MIMO techniques increases scan time of the radar, which may not be acceptable in some applications due to technical constraints. Second, MIMO techniques have stringent requirements on the timing and phase noise of the radar, which can be expensive to execute. Third, MIMO will reduce the maximum unambiguous doppler range of the system. Further, MIMO is limited in its ability to virtually increase antenna array elements because it can only at most reduce the size of the array to half.

Metamaterials may be used to increase resolution, for example, by shrinking wavelengths, allowing for antenna elements to be positioned closer to each other. However, metamaterial can be expensive. Metamaterials also comprise a narrow bandwidth, with limited performance compared to that of a wide bandwidth. The limited performance and the high sensitivity of metamaterials limits the radiation bandwidth which will compromise range resolution of the radar, among other disadvantages.

Synthetic-aperture radar (SAR) may also be used to improve resolution, but also with limitations. For example, with SAR, the roll, pitch, and yaw angle of the platform (e.g., vehicle), as well as its velocity is needed which cannot be estimated accurately. Moreover, it is difficult to maintain phase coherence with SAR.

Accordingly, improved techniques for increasing angular resolution of radars are desired.

SUMMARY

Systems and methods in accordance with various embodiments of the present disclosure may overcome one or more of the aforementioned and other deficiencies experienced in conventional approaches to object detection in radar network systems. In particular, various embodiments describe calibration techniques for improving angular resolution (e.g., azimuth and elevation) of radars by synchronizing the radars to increase the angular resolution of the radars, and further eliminate, cancel, or at least reduce the presence of grating lobes. More specifically, the present embodiments encompass systems, apparatus, and methods for radar networking that utilize sequential detection, calibration techniques, and data filtering to enhance angular resolution in object detection. This includes the utilization of both coarse and fine beamforming, phase compensation, and landmark-based calibration to facilitate precise target identification and tracking within the environment.

In an embodiment, a radar network includes a plurality of radars, e.g., a first radar and a second radar, attached or positioned proximate to a vehicular platform or other such platform including, e.g., an autonomous vehicle platform. During a first stage, calibration parameters can be determined. The calibration parameters can be used to estimate a location of each radar, such as a relative location of the first radar from the second radar.

In an embodiment, a spatial filtering technique such as coarse beam forming is performed on signal data obtained by each radar. For example, the first radar measures first signal data that includes a representation of a landmark in an environment. The first signal data is analyzed to detect the landmark. The second radar measures second signal data that also includes a representation of the landmark. The second signal data is analyzed to detect the landmark.

Calibration parameters can be determined based on a location of the landmark determined using the first signal data obtained from the first radar and a location of the landmark determined using the second signal data obtained from the second radar. For example, a first estimate of a location of the landmark represented in the first radar's coordinate is determined. A second estimate of the location of the landmark represented in the second radar's coordinate is determined.

The radar network is calibrated by setting the first radar as a reference point, and calculating the location of the second radar with respect to the first radar based on the first and second estimates of the location of the landmark.

Phase information is extracted from raw data from the coarse beamforming and phase differences between the first and second radar may be compensated.

During a second stage, fine beamforming in performed on the calibrated radars. The data from fine beamforming and coarse beamforming is combined to eliminate, cancel, or at least reduce grating lobes.

In some aspects, the techniques described herein relate to a radar system for improved angular resolution, including: a first radar on a vehicular platform, the first radar being associated with a reference location, the reference location corresponding to a set of coordinates, the first radar configured to receive first signals reflected from objects within an environment, the first signals being responsive to a first set of a plurality of signals emitted by the first radar; a second radar on the vehicular platform, the second radar being associated with a location to be determined relative to the first radar, the second radar configured to receive second signals reflected from the objects within the environment, the second signals being responsive to a second set of a plurality of signals emitted by the second radar; a computing device processor; and a memory device including instructions that, when executed by the computing device processor, enables the radar system to: receive a first pre-detected target data from the first radar based on preliminary beamforming of the first signals, the first pre-detected target data including a first location of a landmark; receive a second pre-detected target data from the second radar based on preliminary beamforming of the second signals, the second pre-detected target data including a second location of the landmark; and calibrate the first radar and the second radar, by using the reference location as a reference point, setting the first radar's location as the reference location, and calculating the second radar's location based on the reference location, the first location of the landmark, and the second location of the landmark.

In some aspects, the techniques described herein relate to a radar system, wherein the instructions, when executed to calibrate the first radar and the second radar, further enable the radar system to: determine a phase difference between the first radar and the second radar; and compensate for the phase difference in the second radar by adjusting alignment of the received second signals, thereby aligning the phase of the received first signals with the received second signals.

In some aspects, the techniques described herein relate to a radar system, wherein the phase difference quantifies a relative positional or timing misalignment between the received first signals and the received second signals.

In some aspects, the techniques described herein relate to a radar system, wherein the instructions, when executed, further enable the radar system to: receive fine beamforming data based on the received first signals from the calibrated first radar; process the fine beamforming data in conjunction with the received first signals to identify the first pre-detected target data; and combine the first pre-detected target data with the fine beamforming data to cancel out grating lobes.

In some aspects, the techniques described herein relate to a radar system, wherein the instructions, when executed, further enable the radar system to: extract phase information from the first pre-detected target data; and perform fine beamforming on the first pre-detected target, using the calibrated first radar, based on the extracted phase information.

In some aspects, the techniques described herein relate to a radar system, wherein the landmark is one of a static target or dynamic target.

In some aspects, the techniques described herein relate to a radar system, wherein the landmark is one of a pre-existing target or an introduced target.

In some aspects, the techniques described herein relate to a radar system, wherein the first radar and the second radar are positioned at a predetermined distance.

In some aspects, the techniques described herein relate to a radar system, wherein the instructions, when executed, further enable the radar system to: filter data sent through the first radar and the second radar using a sequential detector, including: receiving analog-to-digital converter (ADC) data from the first radar and the second radar, passing the ADC data through range and/or doppler processing, extracting phase and amplitude information for pre-detected targets, and whereby the calibration of the first and second radars improve the angular resolution and reduce the data transfer rate, computational burden, and latency within the radar network.

In some aspects, the techniques described herein relate to a computer-implemented method, including: receiving first signals from a first radar, the first signals reflecting objects within an environment, the first radar being associated with a reference location, the reference location corresponding to a set of coordinates; performing preliminary beamforming on the first signals to obtain a first pre-detected target data, the first pre-detected target data including a first location of a landmark, the landmark being one of the objects within the environment; receiving second signals from a second radar, the second signals reflecting the objects within the environment, the second radar being associated with a location to be determined relative to the first radar; performing preliminary beamforming on the second signals to obtain a second pre-detected target data, the second pre-detected target data including a second location of the landmark; using the reference location as a reference point to calibrate the first radar and the second radar; setting the first radar's location as the reference location; and calculating the second radar's location based on the reference location, the first location of the landmark, and the second location of the landmark.

In some aspects, the techniques described herein relate to a computer-implemented method, wherein calculating the second radar's location further includes determining a relative distance and orientation between the first radar and the second radar based on the first location of the landmark and the second location of the landmark, and applying the determined relative distance and orientation to calibrate the first radar and the second radar.

In some aspects, the techniques described herein relate to a computer-implemented method, further including: calibrating the first radar and the second radar by applying calibration parameters to align the first radar's location with the reference location and determining the second radar's location based on the first location of the landmark and the second location of the landmark.

In some aspects, the techniques described herein relate to a computer-implemented method, further including: determining a phase difference between the first radar and the second radar; and compensating for the phase difference in the second radar by adjusting alignment of the received second signals, thereby aligning the phase of the received first signals with the received second signals.

In some aspects, the techniques described herein relate to a computer-implemented method, wherein the phase difference quantifies a relative positional or timing misalignment between the received first signals and the received second signals.

In some aspects, the techniques described herein relate to a computer-implemented method, further including: receiving fine beamforming data based on the received first signals from the calibrated first radar; processing the fine beamforming data in conjunction with the received first signals to identify the first pre-detected target data; and combining the first pre-detected target data with the fine beamforming data to cancel out grating lobes.

In some aspects, the techniques described herein relate to a computer-implemented method, further including: extracting phase information from the first pre-detected target data; and performing fine beamforming on the first pre-detected target, using the calibrated first radar, based on the extracted phase information.

In some aspects, the techniques described herein relate to a computer-implemented method, wherein the landmark is one of a static target, dynamic target, pre-existing target, or an introduced target.

In some aspects, the techniques described herein relate to a non-transitory computer readable storage medium storing instructions that, when executed by at least one processor of a computing system, causes the computing system to: receive first signals from a first radar, the first signals reflecting objects within an environment, the first radar being associated with a reference location, the reference location corresponding to a set of coordinates; perform preliminary beamforming on the first signals to obtain a first pre-detected target data, the first pre-detected target data including a first location of a landmark, the landmark being one of the objects within the environment; receive second signals from a second radar, the second signals reflecting the objects within the environment, the second radar being associated with a location to be determined relative to the first radar; perform preliminary beamforming on the second signals to obtain a second pre-detected target data, the second pre-detected target data including a second location of the landmark; use the reference location as a reference point to calibrate the first radar and the second radar; set the first radar's location as the reference location; and calculate the second radar's location based on the reference location, the first location of the landmark, and the second location of the landmark.

In some aspects, the techniques described herein relate to a non-transitory computer readable storage medium, wherein the instructions, when executed by the at least one processor, further enables the computing system to: calibrate the first radar and the second radar by applying calibration parameters to align the first radar's location with the reference location and determining the second radar's location based on the first location of the landmark and the second location of the landmark.

In some aspects, the techniques described herein relate to a non-transitory computer readable storage medium, wherein the instructions, when executed by the at least one processor, further enables the computing system to: receive fine beamforming data based on the received first signals from the calibrated first radar; process the fine beamforming data in conjunction with the received first signals to identify the first pre-detected target data; and combine the first pre-detected target data with the fine beamforming data to cancel out grating lobes.

Embodiments provide a variety of advantages. One benefit of the present invention is to reduce the latency and computational burden of a processor in radar signal processing. For example, the invention can filter raw data of the environment received through coarse beamforming of the environment and extract data useful for fine beamforming (e.g., phase information of a specific range-doppler bin) to be sent between radars and/or a central processor for fine beamforming in of the Radar network.

Another benefit of the present invention is to improve angular resolution without having to accommodate for impracticably or infeasibly large physical antenna array. In an embodiment, the radar network comprises a distributed network of radars that are calibrated (e.g., based on landmarks and/or phase differences) to synthesize the effect of a physically large antenna array. Yet another benefit of the present invention is to synchronize (e.g., calibrate) the radars in the radar network without the need for additional antenna elements in the space between the radars.

An additional advantage of the present invention is to eliminate grating lobes resulting from beamforming. Grating lobes (e.g., a plurality of peaks detected in the polar coordinates) can generally occur after beamforming when there is no array element between radars, leading to ambiguity in the location of the target. The rough location determined (from coarse beamforming) is combined with the location of the target determined through course beamforming on the first radar and the location of the target determined through course beamforming on the second radar. During fine beamforming (using the data of both radars), this removes grating lobes (e.g., removes additional ambiguous peaks in the polar coordinates), resulting in the location of the target.

Various other functions and advantages are described and suggested below as may be provided in accordance with the various embodiments.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The approaches described herein relate to systems and methods for improving angular resolution for object detection systems. These approaches enhance the capability to calibrate and synchronize multiple radars, employ beamforming techniques, and process reflected signals from objects within the environment, including identifying landmarks. The system can be integrated into various vehicular and computing environments and leverages sequential detection, fine beamforming, and other strategies to reduce computational burden, latency, and improve overall radar functionality. To provide a better understanding of the approaches and their various embodiments, FIG. 1 illustrates an example environment in which aspects of the various embodiments can be implemented.

Conceptual Architecture

Figure 1:
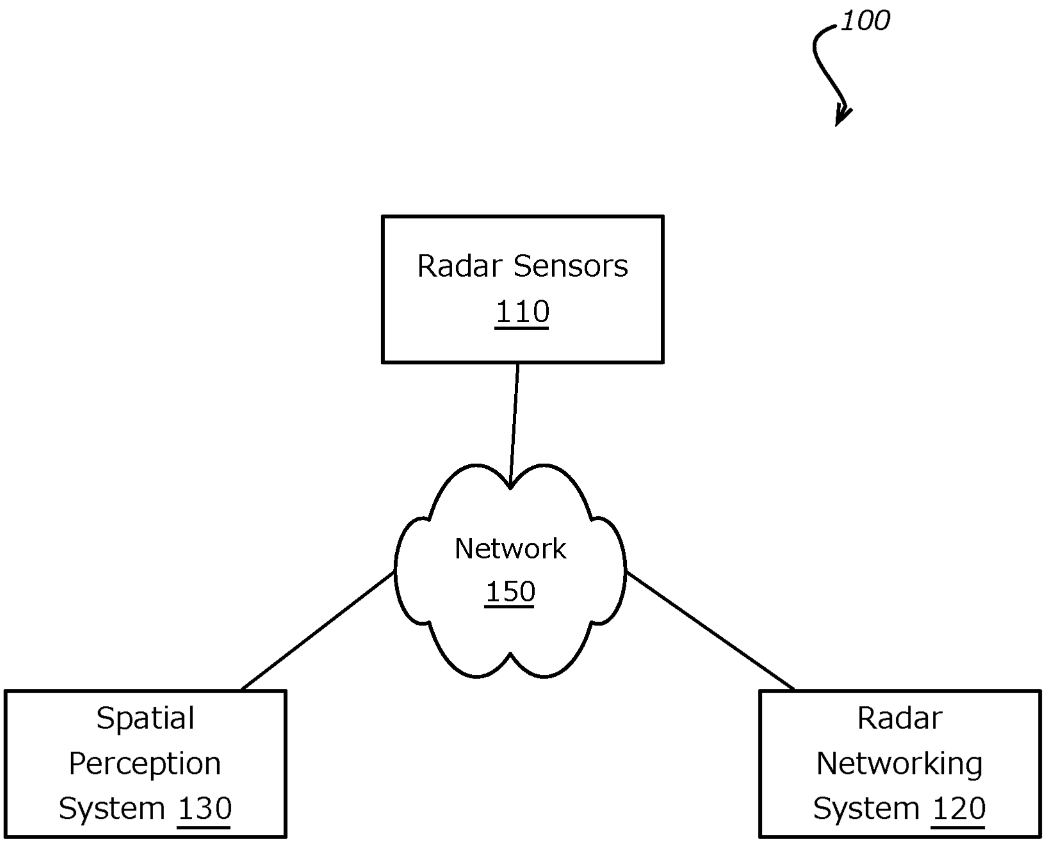
FIG. 1 illustrates an example environment in which aspects of the various embodiments can be implemented.

FIG. 1 illustrates an example environment 100 in which aspects of the various embodiments can be implemented. It should be understood that reference numbers are carried over between figures for similar components for purposes of simplicity of explanation, but such usage should not be construed as a limitation on the various embodiments unless otherwise stated.

As shown, the environment may comprise radar sensors 110, radar networking system 120, and spatial perception system 130. It should be known that the various systems and components described herein are exemplary and for illustration purposes only. Radar sensors 110, radar networking system 120, spatial perception system 130, and network 150 may be on a single system. In another embodiment, they may be on a distributed system. The components may be reorganized or consolidated, as understood by a person of ordinary skill in the art, to perform the same tasks on one or more other servers or devices without departing from the scope of the invention. Other components may be used, as would be readily understood by a person of ordinary skill in the art, without departing from the scope of the embodiments described herein.

As described in the background, conventional radar systems have encountered various challenges and limitations in achieving high angular resolution. From the drawbacks of using single radar units to the complexity of multi-radar systems and other techniques, existing solutions often fall short.

Accordingly, in accordance with various embodiments, approaches described herein allow for improved angular resolution. As will be further described herein, a radar network may include a first radar and a second radar attached to a vehicular platform or another appropriate platform. Through coarse beamforming from each radar, a landmark is detected. The radar network is calibrated, compensating for any phase differences that may arise. Fine beamforming is performed on the calibrated radars, and data from the fine beamforming is processed with the pre-detected target data to cancel out grating lobes. Approaches described herein address the need for enhanced angular resolution, overcoming the challenges faced by conventional systems.

Continuing with FIG. 1, radar sensors 110, herein also referred to as radars or radar units, are configured to transmit radar signals and receive reflected signals from objects or targets within an environment. These objects or targets may include landmarks, which can be both static and dynamic targets, or pre-existing or introduced targets. Landmarks can comprise natural features, built structures, or other distinguishable elements that can be used as reference points for calibration of the radar system.

In an embodiment, radar sensors 110 are positioned at predetermined distances and have associated location information. This information may include geographical coordinates, elevation, azimuth angle, etc. A reference location corresponding to a specific set of coordinates within a global or local coordinate system may be employed, serving as a baseline for determining the relative positions and alignments of other radar sensors within the network.

Radar sensors 110 may transmit signals comprising chirps, where a "chirp" refers to a signal with a frequency that either increases ('up-chirp') or decreases ('down-chirp') over time. These sensors may be implemented in various contexts such as automotive radar systems for detecting other vehicles, pedestrians, road signs, etc., weather radar systems for meteorological purposes, and military radar systems for surveillance and target tracking.

Reflected signals received from the chirps are processed to obtain raw radar-produced data, including details such as distance, speed, direction of movement, size, shape, and radar cross-section of detected objects. This data may further be filtered to remove noise and false targets, and may include specific points or targets represented by coordinates, along with attributes like radar cross-section, Doppler value, and range from the radar sensor.

These reflected signals are processed by radar networking system 120 to enhance angular resolution, synchronization, calibration, and overall functionality of the radar network. Utilizing techniques such as sequential detection, fine beamforming, phase compensation, and landmark-based calibration, radar sensors 110 and corresponding signals provide a synergistic approach to object detection and tracking within various vehicular and computing environments. The innovative integration of these technologies with radar sensors 110 facilitates precise object identification and offers numerous advantages in reducing latency, computational burden, and improving the angular resolution within the radar network.

Radar networking system 120 is described in greater detail in FIG. 2 below, but in general, radar networking system 120 can comprise a distributed network of radars, herein also referred to as radar sensors or radar units, attached or otherwise proximate to a vehicular platform (e.g., a vehicle) or other such platform.

In an embodiment, radars are positioned on the vehicle at predetermined positions. For example, a first radar can be attached to a first location on the vehicle, and a second radar can be attached to a second location on the vehicle. In this example, the first location and/or the second location may be known with respect to a reference location, where the reference location in various embodiments can be the first location, the second location, or another location.

Additionally, the first radar and the second radar are positioned at a predetermined distance from one another. The term "predetermined distance" refers to a distance or location that is known or measurable from a known reference location, such as a fixed point on the vehicular platform or a specific geographic coordinate. This predetermined distance may be intentionally selected and configured based on particular requirements, such as enhancing angular resolution, improving detection accuracy, or facilitating system calibration. By having a predetermined distance between the first and second radars, consistent geometric relationships between the radars are leveraged, enabling precise calculations and adjustments during beamforming and target detection processes. The predetermined distance may be established during manufacturing or installation and verified through various measurement techniques.

In accordance with embodiments described herein, the terms 'radar network,' 'radar system,' and 'radar networking system' are understood to be synonymous. They describe a configuration of interconnected radar devices designed to enhance functionality such as angular resolution, synchronization, calibration, and object detection within various vehicular and computing environments. This includes the implementation of techniques such as sequential detection, fine beamforming, phase compensation, and landmark-based calibration, executed by radar sensors or radar units within the network. Whether referred to as a radar network, radar system, radar networking system, or otherwise, these terms encompass a unified technology designed to provide object identification, reduce latency, minimize computational burden, and improve the angular resolution within the radar systems.

Radar networking system 120 can perform coarse beamforming on each radar, utilizing signal data from both radars to detect landmarks within the environment. Landmarks may include distinguishable natural or artificial features that can be used for calibration. The radar networking system 120 calibrates the radars based on these landmarks, and phase differences may also be compensated between the radars. Fine beamforming follows the calibration, offering improved angular resolution.

For example, the first radar is set as reference point. The location of the landmark based on coarse beamforming from the first radar and the location of the same landmark based on coarse beamforming from the second radar can be used to calculate the location of the second radar with respect to the first radar. Phase differences between the first and second radar may also be compensated. Once calibrated, fine beamforming can be performed on the radars with better angular resolution.

In an embodiment, preliminary or coarse beamforming is utilized to manage large volumes of data typically processed by radar systems. In an embodiment, it begins with the collection of raw radar signals or echoes from various objects within the environment. These signals are captured by multiple antenna elements that may be part of the radar devices, such as the first and second radars described herein. The collected signals are then subjected to temporal and spatial alignment to correlate the information coming from different antennas or radar units. This alignment accounts for differences in arrival times and angles at the receiving elements and assists in focusing the received signals in a specific direction.

After alignment, the signals undergo a weighting process where specific weights are assigned based on the desired direction of focus or predefined filtering criteria. The weighted signals are then combined to form a unified signal representation that emphasizes desired target characteristics. Coarse beamforming aims to provide an initial estimate or "rough sketch" of the target landscape, often employing lower resolution and sensitivity settings compared to subsequent fine beamforming stages. This trade-off allows for quicker processing and reduced computational burden, making it suitable for real-time or near-real-time applications.

The unified signal representation obtained from coarse beamforming is further processed for pre-detection of targets. This stage identifies potential targets within the environment without delving into detailed target characteristics or classification. It acts as a filtering stage that helps in isolating areas or objects of interest for further detailed processing. Furthermore, the preliminary beamforming stage is seamlessly integrated with other stages in the radar processing chain, such as fine beamforming, target classification, and tracking. The outcomes of coarse beamforming serve as inputs to these subsequent stages, ensuring a smooth transition from a general target landscape to more detailed and specific target information.

In accordance with various embodiments, advantageously, preliminary or coarse beamforming serves as a bridge between raw signal collection and detailed target analysis. It optimizes the radar's responsiveness and computational efficiency by focusing on essential target characteristics and filtering out unnecessary information.

Spatial perception system 130 may comprise systems which can utilize objects that are identified based on high resolution detection of the calibrated radar network. In an embodiment, spatial perception system 130 may include autonomous vehicle perception systems or other driver assistance systems. For example, spatial perception system 130 may comprise a vehicular platform (e.g., a vehicle) on which radar networking system 120 is implemented.

In other embodiments, spatial perception system 130 can include other beamforming modules, systems which utilize angle of arrival estimation, phase compensation techniques, and other methods for enhancing spatial awareness.

Spatial perception system 130 may also interact with other sensory systems such as cameras, LIDAR, or ultrasound sensors, to fuse data from various sources and generate a more robust and accurate perception of the environment.

Moreover, spatial perception system 130 can employ machine learning algorithms, pattern recognition, and artificial intelligence to interpret the raw radar data, transforming it into actionable insights. This enables more intelligent decision-making in applications such as autonomous driving, surveillance, and weather prediction.

Network 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network, and any suitable link for connecting the various systems and databases described herein.

The network 150 connects the various systems and computing devices described or referenced herein. In particular embodiments, network is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks. The present disclosure contemplates any suitable network. In an embodiment, radar networking system 120 can be within a network (e.g., in communication with or associated with network 150). In another embodiment, radar networking system 120 can be on the network edge (e.g., contained inside a radar sensor which is in communication with network 150).

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various clients devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiment, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 2:
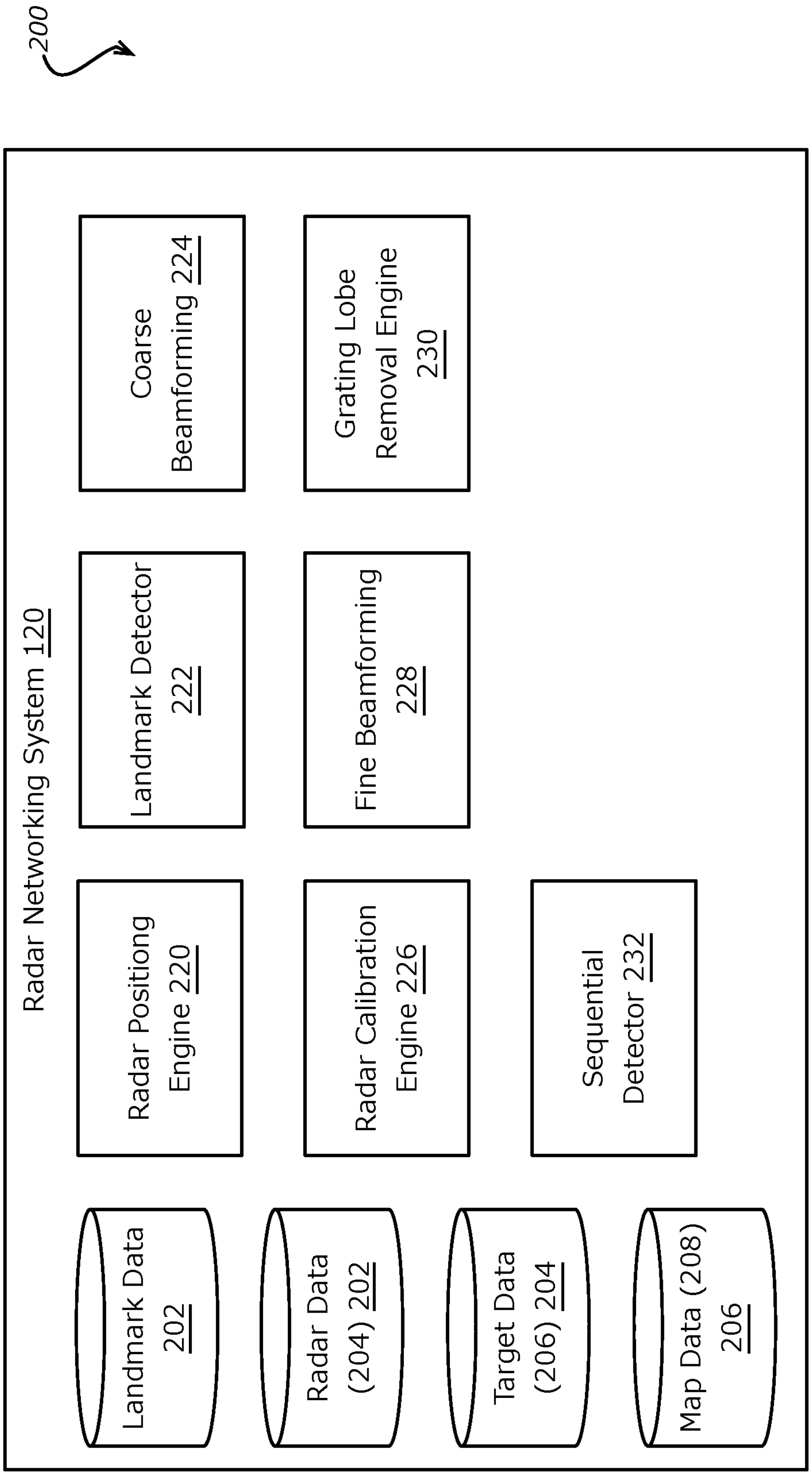
FIG. 2 illustrates an example radar networking system, in which aspects of the various embodiments can be implemented.

FIG. 2 illustrates an example 200 of a radar networking system 120 in accordance with an exemplary embodiment. It should be understood that reference numbers are carried over between figures for similar components for purposes of simplicity of explanation, but such usage should not be construed as a limitation on the various embodiments unless otherwise stated. It should be further known that the various components described herein are exemplary and for illustration purposes only. In this example, the radar networking system 120 may comprise radar positioning engine 220, landmark detector 222, coarse beamforming engine 224, radar calibration engine 226, fine beamforming engine 228, grating lobe engine 230, and sequential detector 232.

Radar networking system 120 may also include or be in communication with one or more data stores, including, for example, landmark data store 202, radar data store 204, target data store 206, and map data store 208. It should be noted that although the data stores are shown as separate data stores, data from the data stores can be maintained across fewer or additional data stores. The data stores can be accessed by each of the various components in order to perform the functionality of the corresponding component. Other components, systems, services, etc. may access the data stores. Although radar networking system 120 is shown as a single system, the system may be hosted on multiple server computers and/or distributed across multiple systems. Additionally, the components may be performed by any number of different computers and/or systems. Thus, the components may be separated into multiple services and/or over multiple disparate systems to perform the functionality described herein.

Radar data store 204 can store radar data, such as each radar's position on the vehicle (height, angle, elevation, etc.), its location (e.g., spherical coordinates) in the environment, its location relative to a reference radar location, among others. Radar data may also include calibration phase data of each radar, phase differences between radars, and historical radar functioning data for predictive maintenance and performance analysis.

Landmark data store 202 can store landmark data, such as the location of the landmark in an environment. Landmarks may be static or dynamic, naturally existing in the environment or deliberately positioned, and so forth. Example landmarks include, for example, buildings, trees, corner reflectors, traffic signs, landmarks, and the like. This data store may also contain detailed attributes of each landmark, such as size, shape, and reflectivity. Landmarks in various embodiments can be used for calibrating the radars as discussed below.

A "static target" within the context of the present embodiments can refer to an object or landmark that remains stationary relative to its surroundings within the environment being scanned by the radar system. This includes physical structures like buildings, bridges, walls, signposts, or other permanent or semi-permanent fixtures, whose location and orientation remain consistent over time. Such static targets may serve as reference points or benchmarks within the radar's operational context, allowing for tasks like calibration and alignment. Conversely, a "dynamic target" refers to an object or landmark capable of movement within the scanned environment, including vehicles, pedestrians, animals, or other entities that can change their position or orientation. Dynamic targets present unique challenges due to their inherent unpredictability and potential for rapid change. The radar system's differentiation between static and dynamic targets, and the appropriate response to each, enables nuanced operation across various scenarios, including vehicular navigation, collision avoidance, and security monitoring. The categorization of targets into static and dynamic groups enhances the system's ability to interpret and interact with its surroundings, thus offering improved performance, flexibility, and robustness across a wide range of applications and settings.

A "pre-existing target" can include, for example, a landmark or object that is naturally found in the environment being scanned by the radar system, such as buildings, natural formations, or stationary vehicles. An "introduced target" can include, for example, an object that has been deliberately placed within the environment for the purpose of radar detection, perhaps for calibration, testing, or specific tracking purposes.

Target data store 206 can store target data, such as data associated with the detection, location, speed, direction, time of detection, radar cross-section values, etc., of a target in the environment. Targets may include landmarks.

Map data store 208 can store map data. Map data can include, for example, geographic positioning data for one or more objects, destinations, and the like; terrain information, road information, traffic rules, weather conditions, etc. In an embodiment, specific regions of interest (ROI) may be selected from map data, in which the radars perform coarse and fine beamforming.

Radar positioning engine 220 is operable to configure and align a plurality of radars on a vehicular platform (e.g., a vehicle) or other suitable platform. This can include, for example, synchronizing the radars to increase the angular resolution of the radars.

In an embodiment, a plurality of radars may include a first radar in a first position on a vehicle and a second radar in a second position on the vehicle. The radars may be positioned at least a threshold distance apart, for example by tens of centimeters apart (e.g., 20 cm, 30 cm, etc.), depending on application requirements.

The positioning might also encompass height alignment, with radars at the same height to increase angular resolution in the azimuth direction, or at different heights to enhance resolution in elevation.

In accordance with various embodiments, radar positioning engine 220 possesses adaptability in configuration, which may be applied to an array of applications or environments. Such adaptability may facilitate integration with additional components including, but not limited to, calibration systems and filtering systems, culminating in a customized radar network. Prospective enhancements may encompass adaptive positioning, collaboration with alternative sensing modalities such as Light Detection and Ranging (LiDAR) or optical camera systems, and alignment with particular safety protocols and regulatory criteria.

The coarse beamforming engine 224 is configured to execute coarse beamforming on signals emanating from each radar, allowing for preliminary detection, or pre-detection, of targets within the environment, such as landmarks, prior to the calibration of the radars. Utilizing map data, the coarse beamforming engine 224 may selectively define a region of interest (ROI) within which coarse beamforming is implemented. This selective determination of an ROI facilitates the efficient isolation of relevant targets, thereby enhancing the operational efficiency of the radar system.

Landmark detector 222 is configured to detect landmarks within the environment, such as within a selected region of interest (ROI). These landmarks may be naturally occurring or deliberately placed, and they may be either static or dynamic. In an embodiment, landmark detector 222 obtains multiple measurements related to the location of the landmark. For instance, a first measurement may consist of the landmark's location based on the first radar's coordinate, utilizing coarse beamforming from the first radar, and a second measurement may be derived from the location of the landmark on the second radar's coordinate, utilizing coarse beamforming from the second radar.

Radar calibration engine 226 is operable to calibrate the radars. This can include, e.g., generating calibration parameters operable to estimate a location of each radar, such as a relative location of one radar from another radar. In an embodiment, radar calibration engine 226 may extrinsically calibrate radars (e.g., calibrating radars with respect to each other). For example, radar calibration engine 226 calibrates a radar by estimating its location with respect to a reference point. The location of the first radar may be set as a reference radar (e.g., (0,0,0). Based on the location ($R_{11}$, $\theta_{11}$, $\Phi_{11}$) of the landmark in the first radar coordinate and the location ($R_{21}$, $\theta_{21}$, $\Phi_{21}$) of the same landmark in the second radar coordinate, radar calibration engine 226 calculates the location (x, y, z) of the second radar with respect to the first radar. Radar calibration engine 226 may further calibrate a radar by estimating and compensating phase differences between radars. Calibration of the radars is described in further detail in FIG. 4, below. In another embodiment, radar calibration engine 226 may intrinsically calibrate the radars. For example, phase differences between multiple antenna elements within a single radar (e.g., due to manufacturing defects, etc.) can be estimated and compensated.

Fine beamforming engine 228 is operable to perform fine beamforming (e.g., with high resolution) on the calibrated radars on potential targets in the environment. In an embodiment, fine beamforming is performed on targets that were pre-detected and whose rough location was identified from earlier coarse beamforming. In an embodiment, fine beamforming further refines the directionality and focus of the radar beams, optimizing the spatial resolution and target discrimination. This process leverages the alignment achieved through the calibration steps, enabling the radars to focus their beams more precisely on the targets of interest. In an embodiment, fine beamforming may involve more detailed adjustments to the phase and amplitude of the signals across the antenna elements, coupled with more advanced signal processing techniques. For example, adaptive algorithms can be used to continuously fine-tune the beam's direction and shape based on the radar's observations, further enhancing the network's ability to detect and track targets with high precision.

Grating lobe removal engine 230 is operable to eliminate grating lobes that occur from fine beamforming from the radars. Grating lobes (e.g., a plurality of peaks detected in the polar coordinates) can generally occur between radars when there is no array element between them, leading to ambiguity in the location (e.g., angle of arrival) of the target. The rough location (from coarse beamforming) is combined with the location of the target determined through fine beamforming on the first radar and the location of the target determined through fine beamforming on the second radar. This removes additional peaks in the polar coordinates (e.g., removes ambiguity), resulting in increased accuracy in the location of the target with no ambiguity or at least decreased ambiguity.

In an embodiment, the integration of rough location (from coarse beamforming) with the location of the target determined through fine beamforming can improve accuracy of the system. For example, the rough location derived from coarse beamforming serves as an initial estimate that is further refined by the application of fine beamforming on both the first radar and the second radar. For example, if the rough location identifies a target within a particular sector or grid within a polar coordinate system, fine beamforming can be employed to precisely pinpoint the target within that sector or grid. This synergistic combination can suppress additional peaks in the polar coordinates that may otherwise introduce ambiguity in the target's location. By utilizing the spatial relationships between the first and second radar's coordinates, a triangulation process may be applied, leveraging the disparate angles of observation to enhance the confidence in the target's exact position.

Sequential detector 232 may be configured to manage the data transmission between radars and/or the central processor, focusing on reducing latency and computational burden. Within this framework, an illustrative embodiment could involve the sequential detector 232 receiving raw data from the radars and subjecting it to a series of filtering operations. For example, the raw data might be initially processed through range filtering to isolate targets within a specific distance band. Following this, Doppler processing could be applied to discriminate targets based on their relative velocities, effectively excluding irrelevant or unwanted reflections. A further stage of detection might then be employed to selectively identify the pertinent features of the targets, such as the phase difference $\Delta\alpha$ between radars. Once these key parameters are extracted, they can be transmitted to fine beamforming engine 228, where they contribute to the detailed analysis and targeting operations. By engaging in this sequential processing and judicious extraction of relevant data, the sequential detector 232 supports the system's overall efficiency, potentially allowing for quicker response times and more nuanced control of the radar apparatus.

Figure 3:
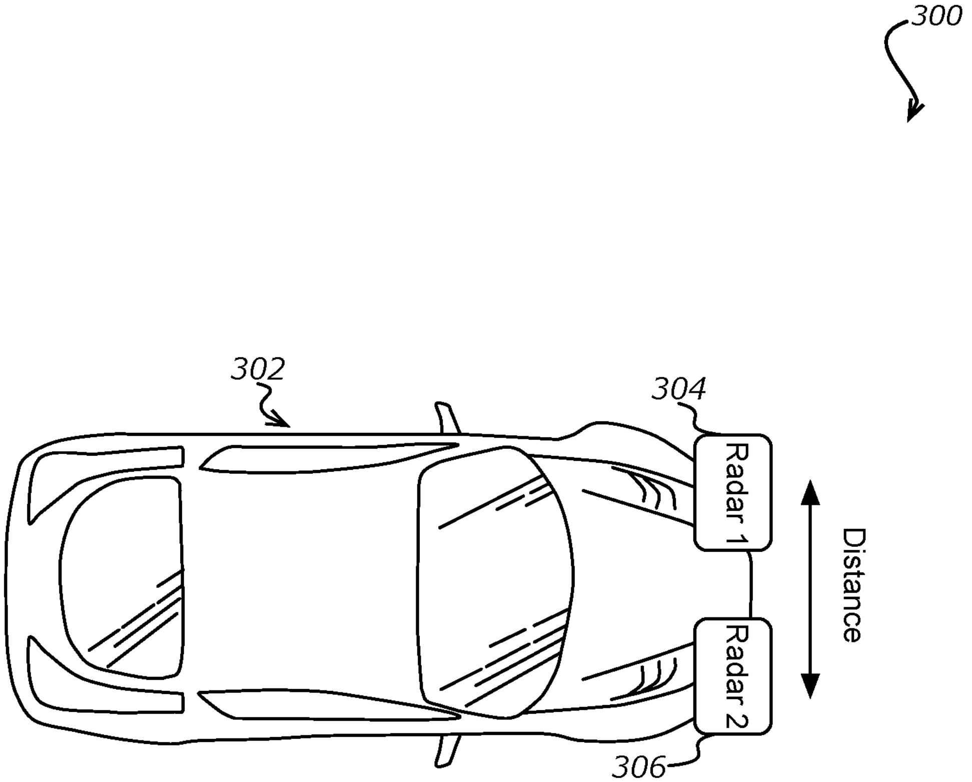
FIG. 3 illustrates an example radar network, in which aspects of the various embodiments can be implemented.

FIG. 3 illustrates an example 300 of a radar network for improved angular resolution, in which aspects of various embodiments can be implemented. In one embodiment, a radar network, also referred to as a radar system, comprises a first radar 304 and second radar 306 are attached to vehicular platform 302, each comprising at least one antenna element and other associated electronic components necessary for radar functionality. The first radar 304 and the second radar 306 may be positioned at least a minimum distance from each other, such as 20 cm, to minimize interference and maximize angular resolution. The positioning may be adjustable to cater to different vehicular shapes and sizes.

In another embodiment, a plurality of radars may be strategically positioned on vehicular platform 302 at predetermined distances, considering the shape and purpose of the vehicle, as well as environmental conditions. A radar may be positioned at each front and rear corner of the vehicular platform 302, on the center of the vehicular platform 302, etc. Some of the plurality of radars may be positioned at the same height, while others are at different heights, facilitating diverse detection patterns. For instance, a front pair of radars may be positioned at a first height, while a rear pair of radars may be positioned at a second height. The varying heights can be leveraged to detect objects at different elevations, thus enhancing the overall radar system's situational awareness.

In this example, the first radar 304 and the second radar 306 can be synchronized in accordance with embodiments described herein to synthesize a large array, even in the absence of additional antenna elements between the first radar 304 and the second radar 306. This synthesized array allows for broader and more precise coverage without substantial hardware complexity. Synchronization can be achieved through advanced calibration techniques, discussed in further detail in FIG. 4. These calibration techniques allow for their synchronization without the need for conventional synchronization mechanisms, such as a shared local oscillator (LO) signal, which may be impractical considering the dynamic nature of vehicular platforms. In environments where the slope is variable, leading to potential tilt, roll, or yaw angle mismatch, the disclosed calibration techniques are designed to calculate and compensate for such variability, maintaining optimal performance under varying conditions.

Figure 4:
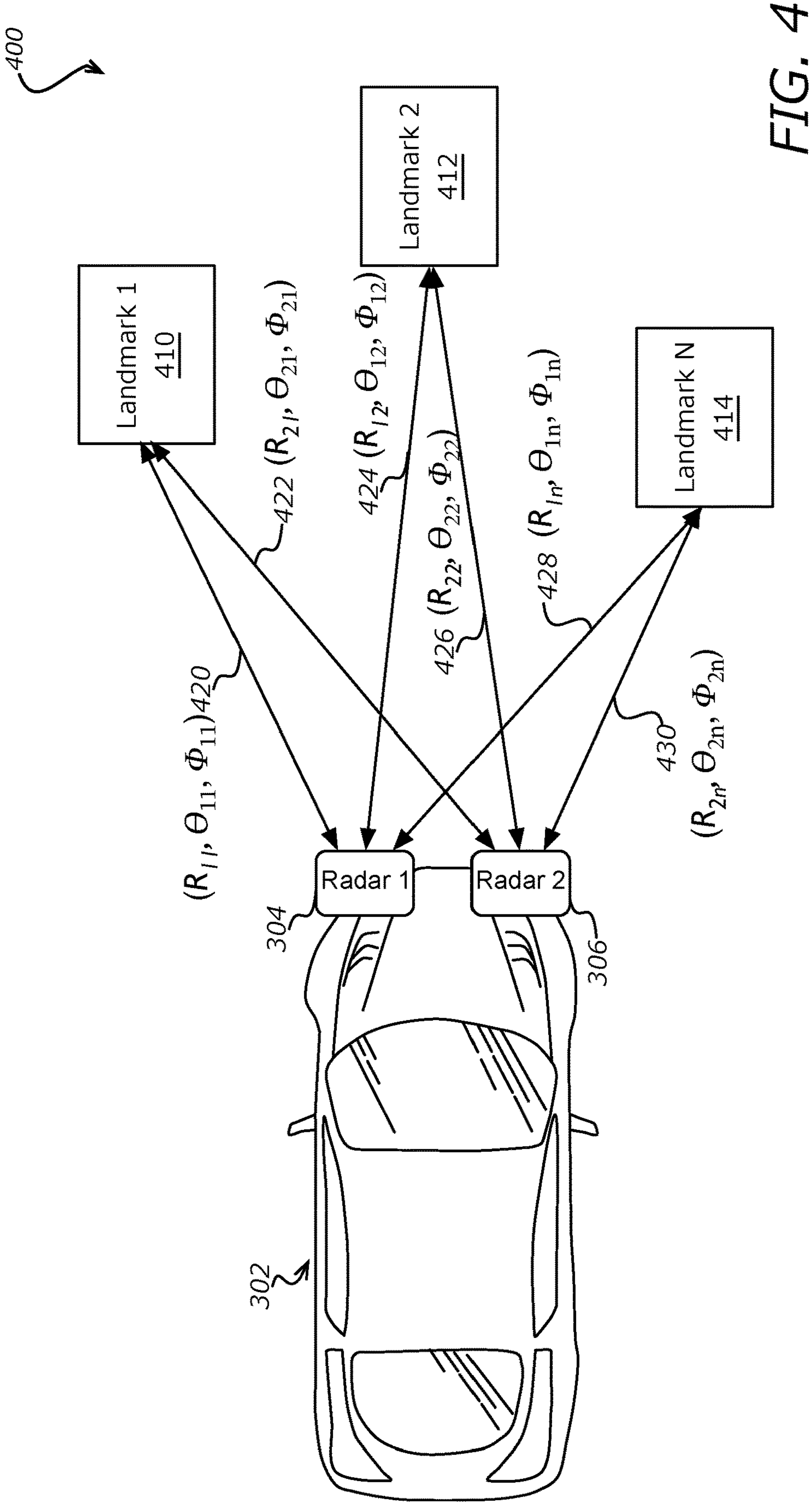
FIG. 4 illustrates an example diagram of calibrating a radar network, in which aspects of the various embodiments can be implemented.

FIG. 4 illustrates an example diagram 400 of calibrating a radar network for improved angular resolution, in which aspects of the various embodiments can be implemented. In an embodiment, calibration may begin with pre-detection of a landmark 410, such as via coarse beamforming, by a first radar 304 and a second radar 306. Landmarks may include static or dynamic targets within an environment. For example, landmark 410 may comprise identifiable objects such as traffic signs, trees, buildings, or other distinguishable features. Such landmarks may be naturally occurring or intentionally placed into the environment to facilitate calibration.

In an embodiment, the location (e.g., spherical coordinates) of the first radar 304 is set as a reference point. The location of radar 306 is assumed as (x, y, z) with respect to the first radar 304. Based on the coarse beamforming from the first radar 304, the location 420 of the landmark 410 in the first radar's 304 coordinate can be defined as $(R_{11}, \theta_{11}, \Phi_{11})$. Based on the coarse beamforming from the second radar 306, the location 422 of the landmark 410 in the second radar's 306 coordinate can be defined as $(R_{21}, \theta_{21}, \Phi_{21})$. The location (x, y, z) of the second radar 306 can be calculated based on the following conversion formulas 1-3:

$$R_{11}\cos(\theta_{11})\sin(\phi_{11})=R_{21}\cos(\theta_{21})\sin(\phi_{21})-x \quad \text{(Formula 1)}$$

$$R_{11}\cos(\theta_{11})\cos(\phi_{11})=R_{21}\cos(\theta_{21})\cos(\phi_{21})-y \quad \text{(Formula 2)}$$

$$R_{11}\sin(\theta_{11})=R_{21}\sin(\theta_{21})-z \quad \text{(Formula 3)}$$

where R is the distance between the landmark 410 and the appropriate radar (e.g., radar 304, radar 306), $\theta$ is the elevation azimuth angle, and $\phi$ is the elevation angle. In an embodiment, (x,y,z) is the relative location of the first radar 304 and second radar 306.

In this example, $R_{21}\cos(\theta_{21})\sin(\phi_{21})$ represents the x-location of landmark 410 in the second radar 306 coordinates. $R_{21}\cos(\theta_{21})\cos(\phi_{21})$ represents the y-location of landmark 410 in the second radar 306 coordinate. $R_{21}\sin(\theta_{21})$ represents the z-location of landmark 410 in the second radar 306 coordinate. Accordingly, the difference between x and the relative distance (e.g., between the first radar 304 and second radar 306) in the x-direction will be the same as the location of that landmark 410 in the reference radar (e.g., the first radar 304).

Additional landmarks 412, 414 may be used to calibrate radars 304 and 306. As shown, based on the coarse beamforming from the first radar 304, the location 424 of the landmark 412 in the first radar's 304 coordinate can be defined as $(R_{12}, \theta_{12}, \Phi_{12})$. Based on the coarse beamforming from the first radar 304, the location 428 of the landmark 414 in the first radar's 304 coordinate can be defined as $(R_{1n}, \theta_{1n}, \Phi_{1n})$. Based on the coarse beamforming from the second radar 306, the location 426 of the landmark 412 in the second radar's 306 coordinate can be defined as $(R_{22}, \theta_{22}, \Phi_{22})$. Based on the coarse beamforming from the second radar 306, the location 430 of the landmark 414 in the second radar's 306 coordinate can be defined as $(R_{2n}, \theta_{2n}, \Phi_{2n})$. Increasing the number of landmarks used in calibration can increase accuracy of radars 304, 306. In another embodiment, a single landmark may be used to increase the accuracy of radars 304, 306, by calibrating the radars 304, 306 with the single landmark 410 over a specific number of iterations. By calibrating the radars 304 and 306 with higher quantities of landmarks and/or higher iterations of a single landmark can reduce (or average out) noise in the estimation of the (x, y, z) location.

Figure 5:
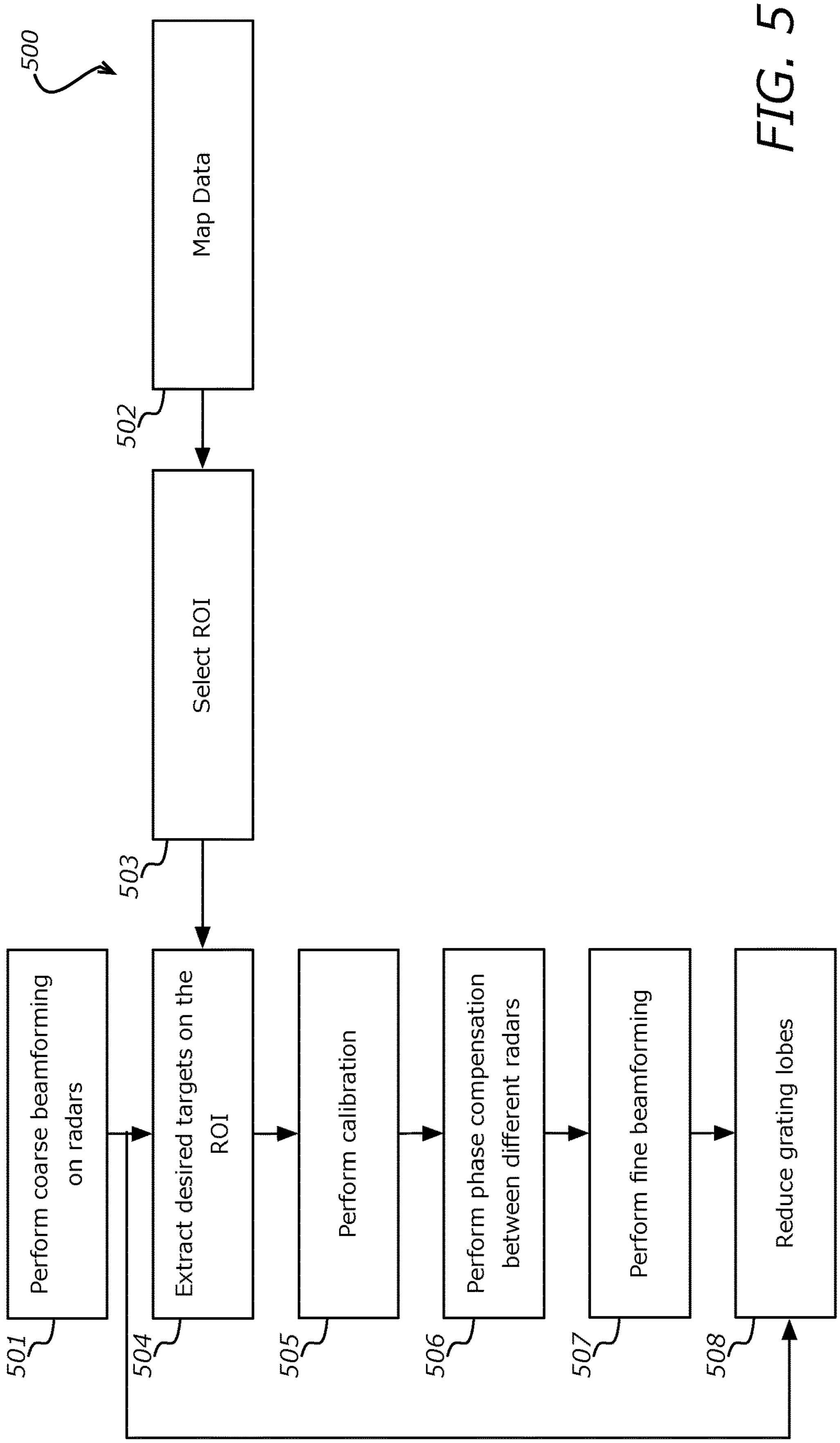
FIG. 5 illustrates an example flowchart for improving angular resolution in a radar system, in which aspects of the various embodiments can be implemented.

FIG. 5 illustrates an example flowchart 500 for improving angular resolution in a radar network, in which aspects of the various embodiments can be implemented. In an embodiment, sequential beamforming and calibration are implemented to calibrate the sensors and increase the angular resolution of the radars on a vehicular platform or another appropriate platform, and further eliminate or at least reduce the problem of grating lobes.

A radar system includes a plurality of radars. The plurality of radars is attached to predetermined positions on a vehicular platform (e.g., a vehicle). Coarse beamforming is performed 501 on each radar. In an embodiment, coarse beamforming is utilized as an introductory stage for the detection and localization of targets within a designated field. The process synthesizes radar signals from multiple antenna elements, providing a preliminary indication of the direction of incoming signals. This general orientation information aids in identifying regions containing potential targets, such as landmarks. In an embodiment, coarse beamforming, executed at a relatively low resolution, reduces computational complexity. By limiting the resolution at this stage, the radar networking system can achieve faster processing times, an attribute beneficial for applications requiring prompt responses. In an embodiment, the coarse beamforming step sets the groundwork for more detailed analyses by delineating regions of interest (ROI). After potential targets have been recognized through coarse beamforming, the identified ROIs may be subject to further scrutiny through techniques that afford higher resolution, such as fine beamforming as performed at step 507. In various embodiments, coarse beamforming may be amalgamated with other data inputs, such as map data or an inertial navigation system (INS). The integration of broad directional information with supplementary contextual inputs enables a more judicious selection of ROIs for ensuing examination.

Using map data 502, including geographical and topographical details, in conjunction with the vehicle's location information from an inertial navigation system (INS), an ROI 503 is selected for each radar (e.g., first radar, second radar, etc.), and desired targets within that region are extracted 504. In an embodiment, the fusion of spatial data enables the radar system to understand the surrounding environment, focusing on areas where targets like landmarks or other vehicles might be located. The selection of an ROI is informed by factors like the vehicle's position, trajectory, traffic density, proximity to known objects, and other situational parameters, and is designed to pinpoint areas where targets are more likely to be present. This process is further informed by historical data, real-time location information, and initial directional information obtained through coarse beamforming. Once the ROI is identified, the desired targets within that region are analyzed and extracted. This strategic approach of narrowing down the search area to specific regions of interest helps in optimizing computational resources. By focusing on contextually relevant regions, the system avoids unnecessary scanning of irrelevant areas, thereby increasing the accuracy and efficiency of the detection process.

After searching the ROI region on each radar, the radars are calibrated 505. Extrinsic calibration can comprise calibrating each radar's location (e.g., (x, y, z) of the second radar) with respect to a reference radar (e.g., first radar) and based on the locations of a landmark from coarse beamforming from each radar (as described in FIG. 4).

Extrinsic calibration can further comprise compensating 506 phase differences between the different radars. For example, the phase difference (also referred to as the relative phase) between a first radar and second radar can be defined as $\Delta\alpha$. In an embodiment, a sweep of $\Delta\alpha$ can be performed to calculate the minimum error between the estimated azimuth and elevation angles using all antenna elements on both the first radar and second radar. In yet another embodiment, a sweep of $\Delta\alpha$ is performed to find the maximum power level at the output of the (fine) beamforming of all radars. The $\Delta\alpha$ value can be validated by checking the reflection from corresponding azimuth estimations. A valid $\Delta\alpha$ value will correspond to a sharp peak (e.g., in polar coordinates) or high intensity reflection or a maximum power measurement.

In an embodiment, intrinsic calibration can also be performed on each radar. With intrinsic calibration, phase differences between different elements within a single radar can be compensated. For example, mismatches between phases of a plurality antennas in a single radar can result from manufacturing detects. A sweep of the phase differences between the elements of the radar can be performed to find the sharp peak (e.g., in polar coordinates) or maximized power from the landmark (e.g., via beamforming from the radar).

In another embodiment, the movement of the vehicle is compensated. As signals are being captured during acceleration or dislocation of the vehicle, the movement of the vehicle can result in phase differences. Thus, the reflection of a target would have a different phase as it moves from one location to another. Compensating the movement of the vehicle requires identifying the moving vehicle's speed. Assuming the targets are static and the platform is rigid), the doppler from different targets can be used to estimate the vehicle's speed in formula 4:

$$\text{Car Speed} = -\text{Doppler} + \cos(\phi+\phi_r) \div \cos(\theta+\theta_r) \quad \text{(Formula 4)}$$

where $\phi_r$ is the radar yaw angle and $\theta_r$ is the radar pitch angle.

Once the (x, y, z) location of the second radar and the phase difference between radars $\Delta\alpha$ are estimated, the phase difference on the second radar is compensated.

After using new (compensated) phases for the radars based on the array manifold, fine beamforming with high resolution can be performed 507 on potential targets in the environment. In an embodiment, the introduction of compensated phases represents a refinement step in the radar's signal processing. By aligning the radar phases with respect to an array manifold, variations and discrepancies between different radar elements are accounted for, thereby attaining a more consistent and coherent signal profile.

The process of fine beamforming with high resolution builds upon the preliminary insights gained through earlier coarse beamforming. While coarse beamforming identifies general areas of interest and provides initial orientation information, the fine beamforming phase delves into a more detailed examination of the targeted regions. Here, the radar's sensitivity and angular resolution are enhanced, enabling a more precise localization and characterization of potential targets.

In an embodiment, the fine beamforming process employs algorithms that factor in the corrected phase information, along with other parameters such as frequency, wavelength, and signal strength. Through iterative analysis and by leveraging the intrinsic properties of the radar waveforms, the system is capable of discerning and isolating specific targets within the environment. This includes the ability to differentiate between closely spaced objects, resolve ambiguities, and create a more refined picture of the surroundings.

In various embodiments, fine beamforming can be tailored to the unique requirements of different scenarios, adjusting parameters like beam width and sensitivity according to the situational needs. By integrating the compensated phase information and utilizing high-resolution techniques, the radar system can enhance its target detection capabilities, providing more accurate and detailed information that informs the decision-making processes within the vehicular platform or other appropriate contexts.

In an embodiment, grating lobes that occur from fine beamforming from the radars can be eliminated 508. Grating lobes, manifested as a plurality of peaks detected in polar coordinates, can generally occur between radars when there is no array element between them. This condition may arise due to the spatial sampling nature of the array and can lead to ambiguity in the location (e.g., angle of arrival) of the target.

In the process of elimination, the pre-detected targets from the earlier coarse beamforming can be used to determine the rough location of the expected target in the selected ROI. This rough location can serve as an initial estimate or reference point for further refinement.

Following this, the system engages in a precise alignment process involving the location of the target as determined through fine beamforming on the first radar, as well as the location determined through fine beamforming on the second radar. For example, in an embodiment, the radar system might utilize a weighted averaging or a filtering approach to reconcile the multiple data points. By correlating the information gathered from both coarse and fine beamforming, the system converges on a more precise location of the target, reducing or eliminating the aforementioned ambiguity. This process of triangulating the target's position based on inputs from different radars and different stages of beamforming offers a robust means to pinpoint the location. In various embodiments, additional layers of error correction or signal processing might be applied to further enhance the accuracy of this determination. By iteratively and systematically refining the target's location through these means, the radar system achieves a nuanced and accurate representation of the target within the environment.

Figure 6:
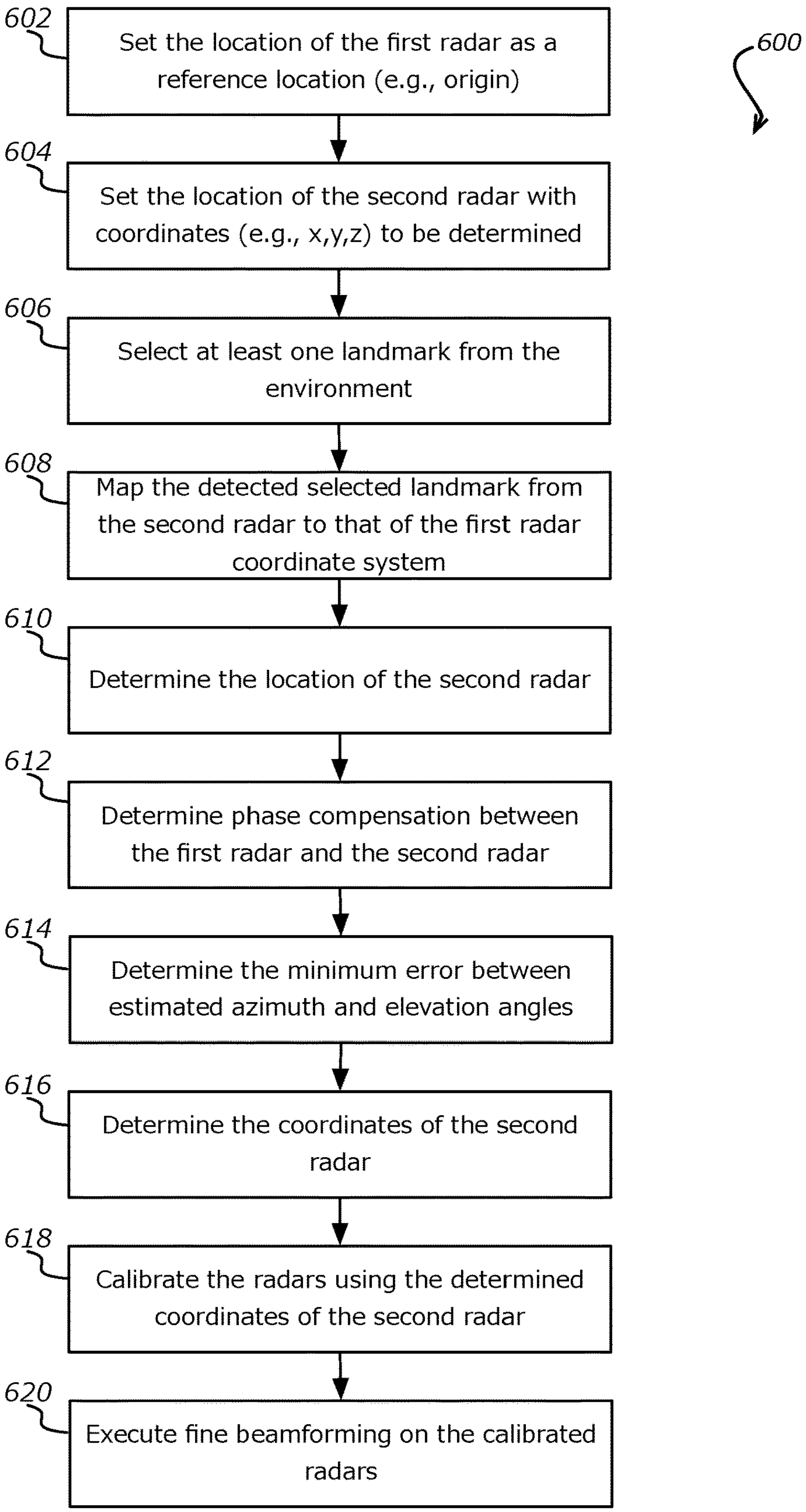
FIG. 6 illustrates an example process of calibrating a radar network for improved angular resolution, in which aspects of the various embodiments can be implemented.

FIG. 6 illustrates an example 600 process of calibrating a radar network for improved angular resolution, in which aspects of the various embodiments can be implemented. In this example, a radar network includes a first radar and a second radar attached to a vehicular platform (e.g., a vehicle) at a predetermined distance from each other (e.g., at least a threshold distance, for example, 20 cm, 30 cm, etc.).

The location of the first radar is set 602 as the reference location. For example, the reference location may be configured as having the coordinates of (0,0,0). In an embodiment, the first radar (e.g., radar 304) acts as the reference point for calibration. The calibration process starts by setting its coordinates as the origin.

The location of the second radar is set 604 with coordinates to be determined. In an embodiment, using the first radar as the reference, the location of the second radar (e.g., radar 306) can be assumed as (x, y, z) to be determined based on the landmark location (as detailed in FIG. 4).

At least one landmark is selected 606 from the environment. In an embodiment, the region of interest (ROI) in the environment is pre-selected, wherein the landmark is within the ROI.

In an embodiment, coarse beamforming is performed on the radar to detect the landmark's location. In an embodiment, the selection of the ROI involves narrowing down the radar's focus to a specific area within the environment where targets or landmarks are likely to be found. This region can be defined based on the vehicle's location, direction of travel, and inertial navigation system (INS) data. For instance, in a vehicular application, the ROI might be selected in the direction of travel, focusing on an area near a crossroad or an intersection where traffic signs or other identifiable objects are commonly found. Additionally, map data and geographic information system (GIS) inputs can be utilized to prioritize areas with known landmarks such as buildings, trees, or bridges, making the ROI selection more intelligent and targeted.

Once the ROI has been selected, the radars begin to search for landmarks within this region. In an embodiment, landmarks are static or dynamic targets that can be used as reference points for calibration. Examples of landmarks include natural features like trees or mountains, built structures like buildings or traffic signs, and even intentionally placed calibration objects. The radar's sensitivity and configuration might be adjusted to look for objects of a particular size, shape, or material, known to exist within the ROI. For example, if the vehicle is approaching a city intersection, the radar system may look for specific traffic signs or light poles that are mapped in its database. These landmarks must be distinguishable from other objects in the environment, allowing them to serve as reliable reference points.

Coarse beamforming is the process by which the radar focuses its energy in a specific direction to detect the landmark within the selected ROI. In coarse beamforming, the radar's multiple antenna elements are combined in such a way that they form a beam with a broader focus. In an embodiment, this can be achieved by adjusting the phase and amplitude of the signals from each antenna element to create a specific radiation pattern. For example, if the selected ROI is to the left of the vehicle's current path, the radar system will adjust the phase of its antenna elements to steer the main beam in that direction. In an embodiment, coarse beamforming serves as an initial scan, providing a rough estimation of the landmark's location without requiring high computational resources. The detected landmarks' coordinates are then utilized in the later stages of calibration for more precise alignment and resolution.

The detected selected landmark is mapped 608 from the second radar's coordinate system to that of the first radar's coordinate system. For example, locations 420 and 422 of the landmark 410 are defined in the coordinate systems of radars 304 and 306, respectively, using coarse beamforming. Said differently, through coarse beamforming from each radar, corresponding location measurements associated with the landmark may be obtained, e.g., a first location (e.g., $(R_{11}, \theta_{11}, \Phi_{11})$) of the landmark in the first radar coordinate and a second location (e.g., $(R_{21}, \theta_{21}, \Phi_{21})$ of the same landmark in the second radar coordinate.

In an embodiment, the mapping helps ensure that both radars have a common reference frame for their measurements. Once a landmark is detected within the region of interest (ROI) and its location has been obtained by coarse beamforming from both radars, the next step is to translate the location from the second radar's coordinate system to that of the first radar.

The mapping may include a coordinate transformation using spherical coordinates. If the first radar's location is set as a reference point, with coordinates such as (0,0,0), the relative location of the second radar can be expressed as (x, y, z). The conversion of the landmark's location from the second radar's coordinate to the first radar's can be achieved using conversion formulas described herein and otherwise known in the art.

In an illustrative example involving a traffic sign, both radars detect the sign as a landmark, with the first radar's coordinates for the landmark as $(R_{11}, \theta_{11}, \Phi_{11})$, and the second radar's coordinates as $(R_{21}, \theta_{21}, \Phi_{21})$, with the second radar's location relative to the first being (x, y, z). By applying the conversion formulas, one can map the landmark's coordinates from the second radar's system to the first radar's system. This mapping ensures that both radars view the landmark in the same spatial context, enabling precise calibration.

The location of the second radar is determined 610. In an embodiment, determining the location of the second radar comprises extrinsic calibration. Extrinsic calibration comprises calculating the coordinates (x, y, z) of the second radar (e.g., radar 306) using formulas 1-3 from FIG. 4. In an embodiment, calibrating the second radar aligns the radars' coordinate systems based on the landmarks' locations.

In an embodiment, the determination of the second radar's location involves a series of mathematical computations using the aforementioned formulas, which relate the spherical coordinates of the landmark in the coordinate systems of the first and second radars. By knowing the spherical coordinates of a particular landmark, such as a tree or building, from the perspective of both radars, the system can compute the relative position of the second radar to the first.

In an example, if two radars detect a common static target, like a traffic sign, the second radar's location can be computed by first identifying the landmark's spherical coordinates in both radars' systems. Then, the conversion formulas are applied to find the relative (x, y, z) coordinates.

In an embodiment, additional landmarks can be used to enhance the accuracy of the location estimation. Using multiple landmarks adds redundancy to the system and helps average out any noise or errors in the estimation of the second radar's location. In another embodiment, multiple iterations of calibration with a single landmark can be employed to enhance the accuracy of the location estimation.

Phase compensation between the radars is determined 612. For example, global beamforming may be performed on the first radar and the second radar to find the most accurate phase difference (da) between the first radar and the second radar. In an embodiment, this phase difference may arise due to relative positional or timing misalignment between the two radars. In an embodiment, $\Delta\alpha$ may be calculated by sweeping $\Delta\alpha$ to obtain the minimum error between the estimated azimuth and elevation angles using all of the antenna elements on a radar or a plurality of the radars. In an embodiment, phase compensation comprises compensating phase differences between the radars to compensate for any positional or timing discrepancies between the radars, thereby aligning the received signals and enhancing the overall performance of the system.

The minimum error between estimated azimuth and elevation angles is determined 614. This step ensures that the angular estimations between both radars are aligned and consistent. In an embodiment, this determination involves an iterative process, where the estimated angles from both radars are compared and refined. An optimization algorithm may be employed to minimize the discrepancies between the angles, achieving a convergence to a common set of azimuth and elevation angles that represent the detected landmark.

The coordinates of the second radar are determined 616. This determination builds on the previous steps and the calculated minimum error between estimated angles. The precise coordinates of the second radar (e.g., radar 306) relative to the first radar are calculated using the refined angular information, the known location of the landmark, and the coordinates of the first radar. This ensures that the second radar is precisely located within the radar network's common coordinate system, enhancing the overall accuracy of the network.

The radars are calibrated 618 using the determined coordinates of the second radar. The calibration ensures that both radars are aligned within a common coordinate system, facilitating consistent target tracking and engagement. In an embodiment, the calibration process involves adjusting the radar hardware, such as the phase and amplitude of the signals across the antenna elements, or software algorithms for target detection and tracking. The calibration process may also include fine-tuning other parameters of the radars, such as sensitivity, gain, and filtering, to achieve a coherent and unified radar network.

Fine beamforming is executed 620 on the calibrated radars. Fine beamforming further refines the directionality and focus of the radar beams, optimizing the spatial resolution and target discrimination. This process leverages the alignment achieved through the calibration steps, enabling the radars to focus their beams more precisely on the targets of interest. In an embodiment, fine beamforming may involve more detailed adjustments to the phase and amplitude of the signals across the antenna elements, coupled with more advanced signal processing techniques. For example, adaptive algorithms can be used to continuously fine-tune the beam's direction and shape based on the radar's observations, further enhancing the network's ability to detect and track targets with high precision.

Figure 7:
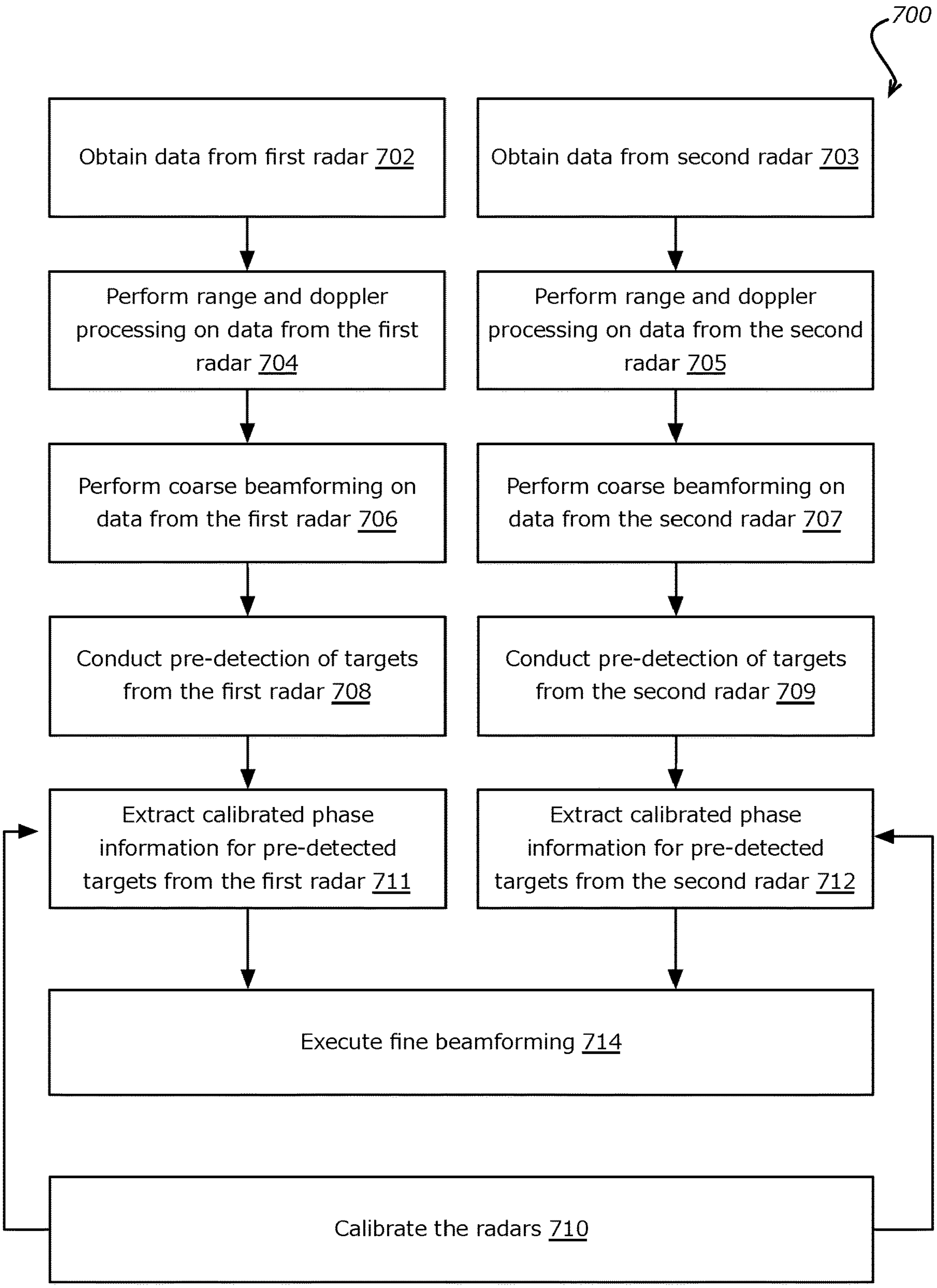
FIG. 7 illustrates an example flowchart for filtering data sent through a radar network using a sequential detector, in accordance with various embodiments.

FIG. 7 illustrates an example 700 flowchart for filtering data sent through a radar network using a sequential detector, in accordance with various embodiments. In an embodiment, to reduce the large amounts of data sent between radars and/or a central processor, and thereby reducing latency and computational burden on the processor, data sent through the radar network is filtered.

In an embodiment, analog-to-digital converter (ADC) data is received 702, 703 from the first radar and second radar, respectively. In an embodiment, this data encapsulates the raw radar signals that require further processing to be utilized effectively.

Following the acquisition of ADC data, the information is passed through range and Doppler processing 704, 705 for both the first and second radars. This processing stage serves to transform the raw data into a format where distance (range) and velocity (Doppler) attributes of detected targets can be discerned, paving the way for more advanced analyses.

Coarse beamforming is performed 706, 707 on the first radar and second radar, respectively. This step focuses the radar beams to enable a more efficient detection of targets within the environment. It serves as an initial scanning phase, providing a broad and general assessment of potential targets in the radar's field of view.

Subsequently, pre-detection of targets in the environment is carried out 708, 709, respectively for the first and second radars. This step represents an intermediary stage of target detection, where potential targets are identified, but not yet confirmed or precisely located.

Calibration of the radars is performed 710, ensuring that both radars are aligned within a common coordinate system. This may involve the use of formulas 1-3, as described in FIG. 4.

The phase and amplitude information of the pre-detected target data is extracted 711, 712, with unnecessary data being discarded. This efficient filtering of the data minimizes the data transfer rate, alleviating the need to send raw ADC data to other radars and/or the central processor, thus reducing the risk of overloading the system.

In an embodiment, the extracted phase information is calibrated, enabling the estimation and compensation of phase differences (e.g., $\Delta\alpha$) between the calibrated radars for the same pre-detected targets. This calibrated phase information is subsequently leveraged by the calibrated radar network to execute fine beamforming 714 on targets within the environment. The fine beamforming step provides higher angular resolution, enabling more precise detection and tracking of targets (for example, the pre-detected target, other targets, etc.)

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 8:
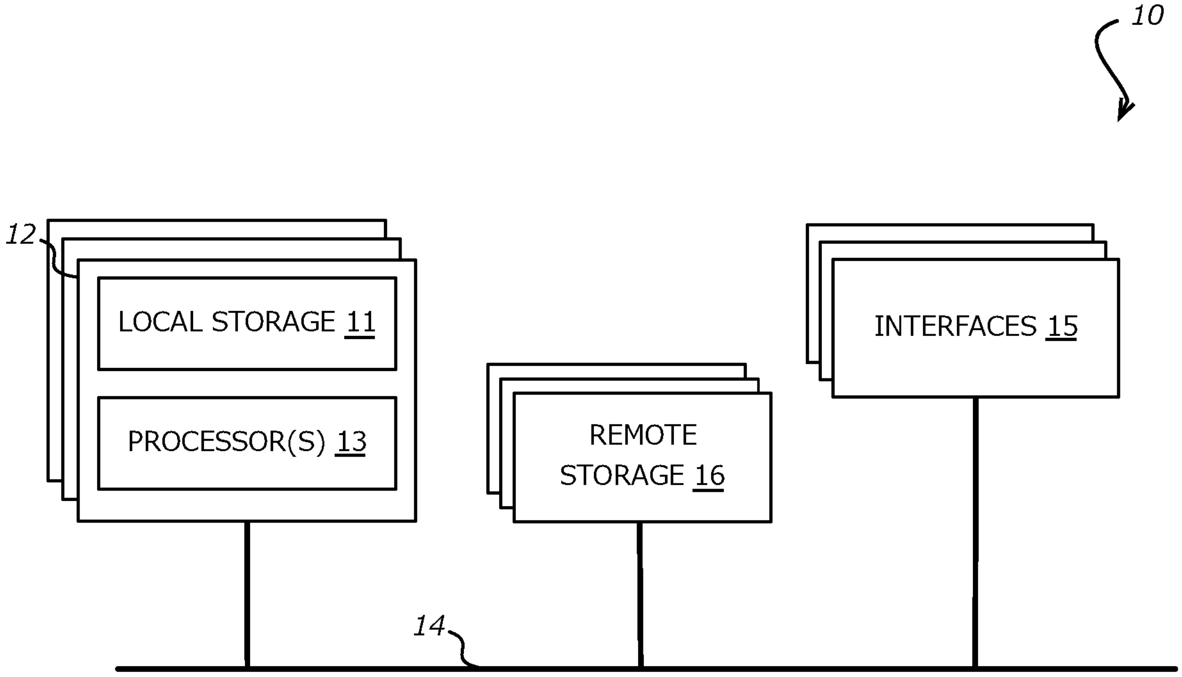
FIG. 8 illustrates components of a computing device that supports an embodiment of the present invention.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASIC s), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a JAVA virtual machine or equivalent, or files containing higher level code that may be executed by the computer using an interpreter (for example, scripts written in Python, Perl, Ruby, Groovy, or any other scripting language).

Figure 9:
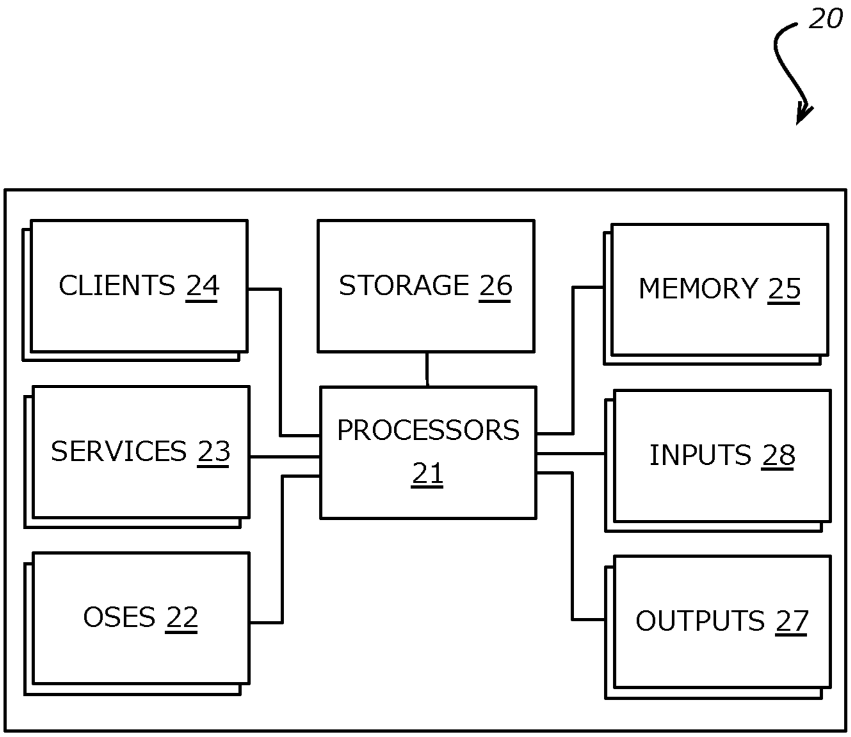
FIG. 9 illustrates an exemplary architecture of a system that supports an embodiment of the present invention.

In some embodiments, systems may be implemented on a standalone computing system. Referring now to FIG. 9, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
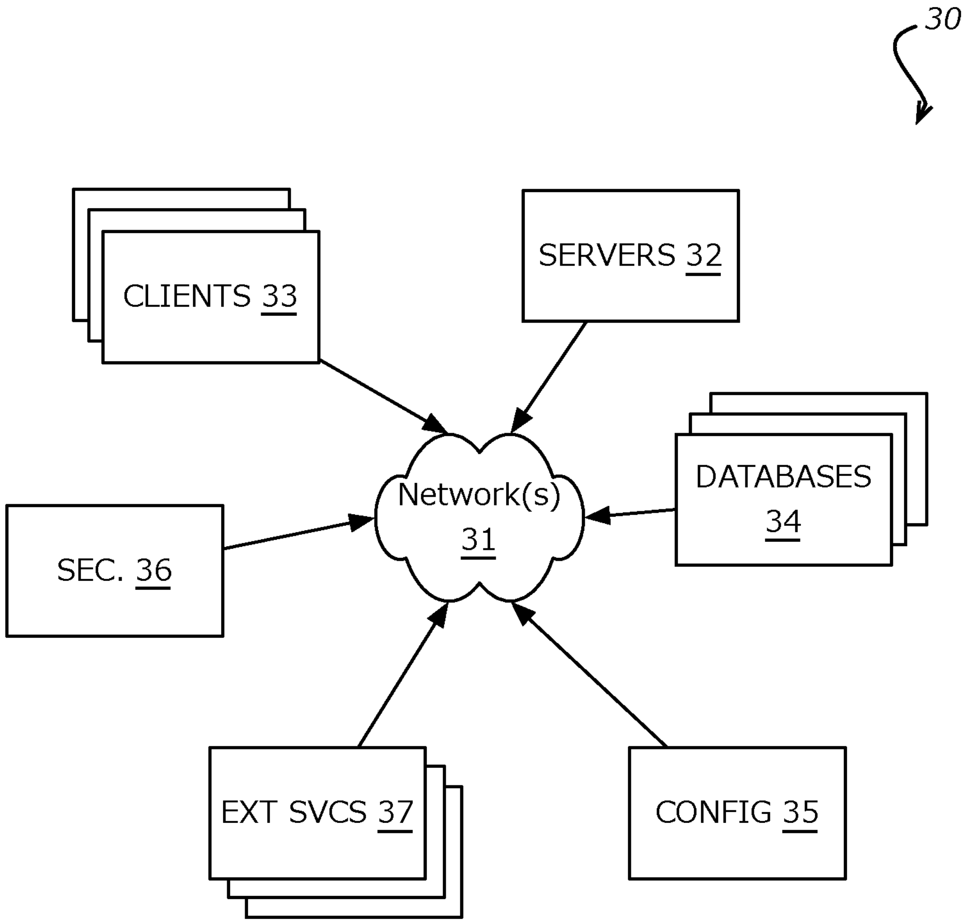
FIG. 10 illustrates another exemplary architecture of a system that supports an embodiment of the present invention.

In some embodiments, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CAS SANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 11:
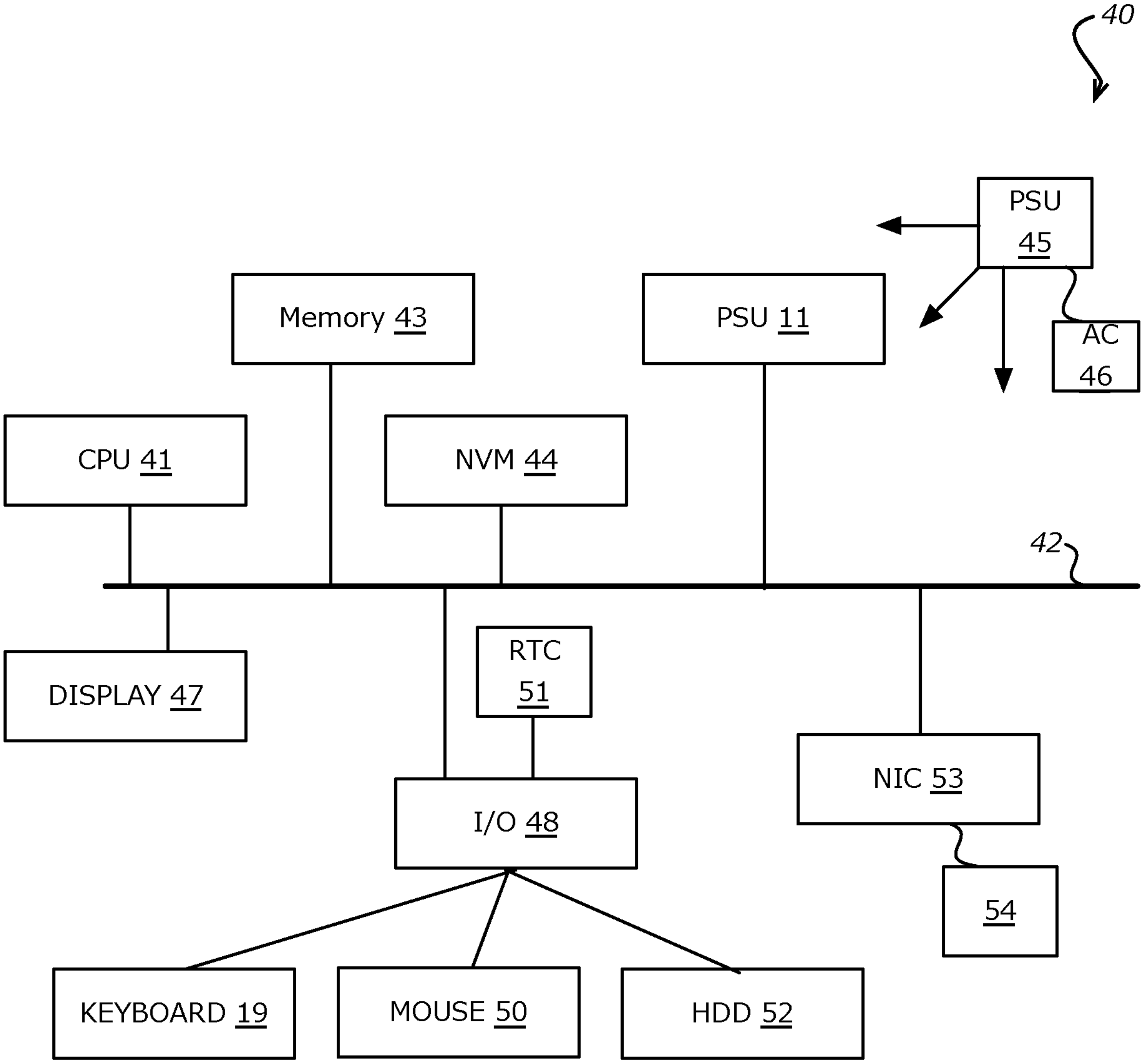
FIG. 11 illustrates components of a computer system that supports an embodiment of the present invention.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

Additional Considerations

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A radar system for improved angular resolution, comprising:

a first radar on a vehicular platform, the first radar being associated with a reference location, the reference location corresponding to a set of coordinates, the first radar configured to receive first signals reflected from objects within an environment, the first signals being responsive to a first set of a plurality of signals emitted by the first radar;

a second radar on the vehicular platform, the second radar being associated with a location to be determined relative to the first radar, the second radar configured to receive second signals reflected from the objects within the environment, the second signals being responsive to a second set of a plurality of signals emitted by the second radar;

a computing device processor; and a memory device including instructions that, when executed by the computing device processor, enables the radar system to:

receive a first pre-detected target data from the first radar based on preliminary beamforming of the first signals, the first pre-detected target data including a first location of a landmark;

receive a second pre-detected target data from the second radar based on preliminary beamforming of the second signals, the second pre-detected target data including a second location of the landmark; and calibrate the first radar and the second radar, by using the reference location as a reference point, setting the first radar's location as the reference location, and calculating the second radar's location by determining a geometric relationship between the first location of the landmark and the second location of the landmark, the geometric relationship defining a relative position of the second radar with respect to the first radar.

2. The radar system of claim 1, wherein the instructions, when executed to calibrate the first radar and the second radar, further enable the radar system to:

determine a phase difference between the first radar and the second radar; and compensate for the phase difference in the second radar by adjusting alignment of the received second signals, thereby aligning a phase of the received first signals with the received second signals.

3. The radar system of claim 2, wherein the phase difference quantifies a relative positional or timing misalignment between the received first signals and the received second signals.

4. The radar system of claim 1, wherein the instructions, when executed, further enable the radar system to:

receive fine beamforming data based on the received first signals from a calibrated first radar;

process the fine beamforming data in conjunction with the received first signals to identify the first pre-detected target data; and combine the first pre-detected target data with the fine beamforming data to cancel out grating lobes.

5. The radar system of claim 1, wherein the instructions, when executed, further enable the radar system to:

extract phase information from the first pre-detected target data; and perform fine beamforming on the first pre-detected target data, using a calibrated first radar, based on the extracted phase information.

6. The radar system of claim 1, wherein the landmark is one of a static target or dynamic target.

7. The radar system of claim 1, wherein the landmark is one of a pre-existing target or an introduced target.

8. The radar system of claim 1, wherein the first radar and the second radar are positioned at a predetermined distance.

9. The radar system of claim 1, wherein the instructions, when executed, further enable the radar system to:

filter data sent through the first radar and the second radar using a sequential detector, comprising:

receiving analog-to-digital converter (ADC) data from the first radar and the second radar, passing the ADC data through range and/or doppler processing, extracting phase and amplitude information for pre-detected targets, and whereby calibration of the first radar and the second radar is operable to improve angular resolution and reduce data transfer rate, computational burden, and latency within the first radar and the second radar.

10. A computer-implemented method, comprising:

receiving first signals from a first radar, the first signals reflecting objects within an environment, the first radar being associated with a reference location, the reference location corresponding to a set of coordinates;

performing preliminary beamforming on the first signals to obtain a first pre-detected target data, the first pre-detected target data including a first location of a landmark, the landmark being one of the objects within the environment;

receiving second signals from a second radar, the second signals reflecting the objects within the environment, the second radar being associated with a location to be determined relative to the first radar;

performing preliminary beamforming on the second signals to obtain a second pre-detected target data, the second pre-detected target data including a second location of the landmark;

using the reference location as a reference point to calibrate the first radar and the second radar;

setting the first radar's location as the reference location; and calibrating the first radar and the second radar, by using the reference location as a reference point, setting the first radar's location as the reference location, and calculating the second radar's location by determining a geometric relationship between the first location of the landmark and the second location of the landmark, wherein the geometric relationship defines a relative position of the second radar with respect to the first radar.

11. The computer-implemented method of claim 10, wherein calculating the second radar's location comprises:
expressing the first location of the landmark as a range, an azimuth angle, and an elevation angle relative to the first radar;
expressing the second location of the landmark as a range, an azimuth angle, and an elevation angle relative to the second radar; and
determining a relative Cartesian position of the second radar with respect to the first radar based on the expressed ranges and angles.

12. The computer-implemented method of claim 10, further comprising:
calibrating the first radar and the second radar by applying calibration parameters to align the first radar's location with the reference location and determining the second radar's location based on the first location of the landmark and the second location of the landmark.

13. The computer-implemented method of claim 10, further comprising:
determining a phase difference between the first radar and the second radar; and
compensating for the phase difference in the second radar by adjusting alignment of the received second signals, thereby aligning a phase of the received first signals with the received second signals.

14. The computer-implemented method of claim 13, wherein the phase difference quantifies a relative positional or timing misalignment between the received first signals and the received second signals.

15. The computer-implemented method of claim 10, further comprising:
receiving fine beamforming data based on the received first signals from a calibrated first radar;
processing the fine beamforming data in conjunction with the received first signals to identify the first pre-detected target data; and
combining the first pre-detected target data with the fine beamforming data to cancel out grating lobes.

16. The computer-implemented method of claim 10, further comprising:
extracting phase information from the first pre-detected target data; and
performing fine beamforming on the first pre-detected target data, using a calibrated first radar, based on the extracted phase information.

17. The computer-implemented method of claim 10, wherein the landmark is one of a static target, dynamic target, pre-existing target, or an introduced target.

* * * * *